(12) United States Patent
Bostedo et al.

(10) Patent No.: US 6,170,511 B1
(45) Date of Patent: Jan. 9, 2001

(54) NORMALLY OPEN PURGE VALVE

(75) Inventors: Robert G. Bostedo, Pittsburgh;
Gregory L. Johnston, Tarentum;
Robert D. Dimsa, Elizabeth; Daniel G. Scott, Pittsburgh; Ralph Santoro, Jr., New Kensington, all of PA (US)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/379,874

(22) Filed: Aug. 24, 1999

(51) Int. Cl.[7] ........................................... F16K 7/12
(52) U.S. Cl. ............................. 137/204; 137/510
(58) Field of Search ..................... 137/203, 204, 137/510

(56) References Cited

U.S. PATENT DOCUMENTS

| | | | |
|---|---|---|---|
| 2,610,645 | * | 9/1952 | Wagner ............................. 137/510 X |
| 2,973,773 | * | 3/1961 | Siri .................................... 137/510 X |
| 3,029,830 | * | 4/1962 | Klover et al. ............... 137/625.62 X |
| 3,659,625 | * | 5/1972 | Coiner et al. ......................... 137/204 |
| 3,788,592 | * | 1/1974 | Klatt et al. ....................... 251/61.1 X |

* cited by examiner

*Primary Examiner*—Gerald A. Michalsky
(74) *Attorney, Agent, or Firm*—James Ray & Associates

(57) ABSTRACT

A purge valve for expelling liquid contaminants from a fluid conduit which is normally unpressurized but is at times pressurized with a gas which contains liquid contaminants. It has a housing, a diaphragm mounted within the housing, a control chamber on a first side of the diaphragm, an exhaust passage on a second side of the diaphragm and a valve seat surrounding the exhaust passage. The valve seat is positioned so that the diaphragm can seal against it. A spring on the second side of the diaphragm presses it away from the seat. An annular chamber is on the second side of the diaphragm, surrounding the exhaust passage. The annular chamber is open to the exhaust passage when the diaphragm is unseated from the valve seat. The valve has a low impedance flow path between the control chamber and the fluid conduit. The valve also has a high impedance discharge flow path connected to the annular chamber. The high impedance discharge flow path may be connected to the control chamber, connected to the low impedance flow path, or it may be for connection to the fluid conduit. When the valve is connected to the fluid conduit, it is open due to the spring force whenever the fluid conduit is unpressurized so that the liquid contaminant may drain from the valve. When the fluid conduit is pressurized, the diaphragm is pressed against the valve seat so that the valve is closed.

21 Claims, 3 Drawing Sheets

NORMALLY OPEN PURGE VALVE

FIELD OF THE INVENTION

The present invention relates, in general, to a valve for purging contaminant liquids from a conduit which at times contains a pressurized gas and, more particularly, the instant invention relates to a valve for purging contaminant liquids from a railway vehicle brake air line which is normally unpressurized.

BACKGROUND OF THE INVENTION

The invention specifically applies to the independent brake line of a locomotive, for example, to the 20 Line in the EPIC$^a$ 3102 Braking system.

The independent brake system of a locomotive operates independently of the automatic airbrake system which includes the brake air line which is connected between all the railway cars in a train. The independent brake system applies brakes only on the locomotive. It is used, for example, when a locomotive is not connected to other railway cars, but is moved independently, for example, within a switchyard or a maintenance facility.

The independent brake system of a locomotive has a brake air line which is pressurized to apply brakes on the locomotive and is depressurized to release brakes. The independent brake system works in a manner exactly opposite to the automatic airbrake system of a train, in which the brake line is pressurized to remove brakes and depressurized to apply brakes.

In addition to its use for controlling an isolated locomotive in a switchyard or maintenance facility, the independent brake system is also used on other occasions when it is desired to apply brakes in the locomotive, but not in the other railway cars. For example, it is generally desirable for an engineer to place all the cars in a train in either a tension mode, or in a compression mode to reduce impact forces on couplers and draft gears due to relative motion of coupled cars. To place a train in a compression mode, as for example, prior to descending a grade, an engineer may retard the locomotive using the independent brake system so that the line of cars compresses against the locomotive.

The EPIC$^a$ 3102 Braking system uses transducers to measure the pressure in the independent application and release line. Difficulty has been experienced during winter weather conditions due to freezing of moisture in the independent application and release line. The transducers which measure pressure in the independent application and release line may freeze, or the fluid pathways to the transducers may become blocked with ice. Accordingly, it is necessary to remove condensed moisture from the independent application and release line. The independent application and release line may also have other fluid contaminants such as oil droplets and it is also desirable to purge these from the system.

SUMMARY OF THE INVENTION

In one aspect, the present invention is a purge valve for expelling a liquid contaminant from a fluid conduit which is normally unpressurized but is at times pressurized with a gas which contains the liquid contaminant. The valve has a housing, a diaphragm mounted within the housing, a control chamber on a first side of the diaphragm, an exhaust passage on a second side of the diaphragm and a valve seat surrounding an upstream end of the exhaust passage. The valve seat is positioned so that the diaphragm may seal against the valve seat. A spring is placed on the second side of the diaphragm to provide a spring force on the diaphragm to press it away from the valve seat. An annular chamber is provided on the second side of the diaphragm, the annular chamber surrounding the exhaust passage. The annular chamber is open to the exhaust passage when the diaphragm is not sealed against the valve seat. The valve has a relatively low impedance flow path connected to the control chamber, the relatively low impedance flow path being for connection to the fluid conduit. The valve also has a relatively high impedance discharge flow path connected to the annular chamber and connected to receive pressure from the fluid conduit. When the valve is connected to the fluid conduit, it is open due to the spring force whenever the fluid conduit is unpressurized so that the liquid contaminant may drain from the fluid conduit through the discharge flow path to the annular chamber and thence be purged from the valve through the exhaust passage. When the fluid conduit is pressurized, a greater pressure exists in the control chamber than in the annular chamber or the exhaust passage so that the diaphragm is pressed against the valve seat and seals against the valve seat, so that the valve is closed. When pressure is first applied, for a brief time before the valve closes, contaminant liquids are forcefully expelled from the valve by the rising pressure.

In another aspect, the present invention is a purge valve arrangement for expelling a liquid contaminant from a fluid conduit which is normally unpressurized but is at times pressurized with a gas which contains the liquid contaminant. The arrangement has a liquid separator which has a relatively dry connection point and a relatively wet connection point attached to the fluid conduit. It should be understood that the terms "wet" and "dry" refer to the presence and absence of the liquid contaminant. The system also has a purge valve which has a housing and a diaphragm mounted within the housing. The valve has a control chamber on a first side of the diaphragm and an exhaust passage on a second side of the diaphragm. It has a valve seat surrounding the upstream end of the exhaust passage, the valve seat positioned so that the diaphragm may seal against the valve seat. A spring is located on the second side of the diaphragm to provide a spring force on the diaphragm to press the diaphragm away from the valve seat. An annular chamber is provided on the second side of the diaphragm, the annular chamber surrounding the exhaust passage. The annular chamber is open to the exhaust passage when the diaphragm is not sealed against the valve seat. The valve arrangement has a relatively low impedance flow path between the control chamber and the relatively dry point and it has a relatively high impedance discharge flow path between the annular chamber and the relatively wet point. The valve is open due to the spring force whenever the fluid conduit is unpressurized so that the liquid contaminant may drain from the fluid conduit through the high impedance discharge flow path to the annular chamber and thence be purged from the valve through the exhaust passage. When the fluid conduit is pressurized, a greater pressure exists in the control chamber than in the annular chamber or the exhaust passage so that the diaphragm is pressed against the valve seat and seals against the valve seat, so that the valve is closed. When pressure is first applied, for a brief time before the valve closes, contaminant liquids are forcefully expelled from the valve by the rising pressure.

OBJECTS OF THE INVENTION

It is, therefore, one of the primary objects of the present invention to provide a valve for eliminating liquid contaminants from a conduit which at times contains a pressurized gas.

Another object of the present invention is to provide a valve for a conduit which at times contains a pressurized gas, the valve being open whenever the conduit is unpressurized so that liquid contaminants may drain from the valve.

It is a further object of the present invention to provide a valve for a conduit which at times contains a pressurized gas, the valve closing whenever the conduit is pressurized to prevent loss of gas from the conduit.

It is another object of the present invention to provide a valve for a conduit which at times contains a pressurized gas, the valve remaining open for a brief time after pressure is applied so that the pressure forcefully expels contaminant liquids during the brief time and then seals to prevent further loss of pressurizing gas.

It is an additional object of the present invention to provide a valve for a conduit which at times contains a pressurized gas and which has transducers for measuring pressure, the gas being contaminated with water and the valve removes water so that the transducers or pathways to the transducers do not freeze.

Another object of the present invention is to provide a valve arrangement for eliminating liquid contaminants from a fluid conduit which at times contains a pressurized gas from a point on the conduit which has a relatively high amount of the liquid contaminant and using a gas from a relatively dry point on a liquid separator which is connected to the conduit to control such valve arrangement.

It is an additional object of the present invention to provide a valve arrangement for eliminating liquid contaminants from a fluid conduit which at times carries a pressurized gas, the valve arrangement not requiring frequent maintenance, or attention by personnel.

It is a further object of the present invention to provide a valve arrangement for eliminating liquid contaminants from a fluid conduit which at times carries a pressurized gas, the valve arrangement functioning automatically to drain liquid contaminants whenever the conduit is not pressurized.

Still another object of the present invention is to provide a valve for removing water from the independent brake line of a locomotive, the valve being open whenever the independent brake line is depressurized and closed whenever the independent brake line is pressurized.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
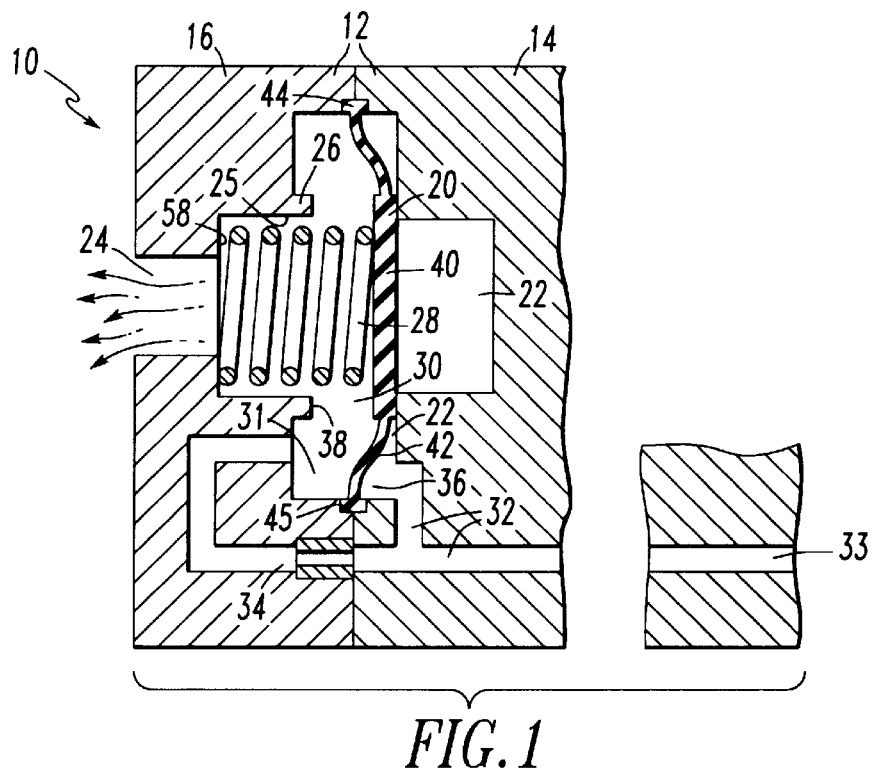
FIG. 1 is a median section of a presently preferred embodiment of the valve in which the high impedance discharge flowpath is connected to a low impedance flowpath between the conduit being purged arid the control chamber of the valve, the valve being in an open position.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

FIG. 1 shows a presently preferred embodiment of the invention. This figure shows a purge valve, generally designated 10, which is for expelling liquid contaminants from a fluid conduit 33. Fluid conduit 33 is normally unpressurized but is at times pressurized with a gas which contains the liquid contaminant. Valve 10 includes a housing 12 which has a first housing portion 14 and a second housing portion 16. Valve 10 has a diaphragm 20 mounted within housing 12 and a control chamber 22 on a first side of diaphragm 20. Diaphragm 20 has a relatively flexible outer portion 42 surrounding a relatively stiff inner portion 40.

Valve 10 also has an exhaust passage 24 surrounded by a valve seat 26. Valve seat 26 is positioned so that diaphragm 20 can seat against it. Spring 28 is located on the second side of diaphragm 20 to provide a spring force on diaphragm 20 to press it away from valve seat 26. Spring 28, preferably, is placed within a large diameter inner portion 25 of exhaust passage 24 and, preferably, seats against inside shoulder 58 in exhaust passage 24. An annular chamber 30 is on the second side of diaphragm 20. Annular chamber 30 is open to exhaust passage 24 when diaphragm 20 is not seated against valve seat 26. The position of diaphragm 20 is determined by pressure in control chamber 22 in comparison with pressure in annular chamber 30 and exhaust passage 24 and the force applied to diaphragm 20 by spring 28.

A relatively low impedance flow path 32 is connected to control chamber 22, preferably at its lowest point 36. Low impedance flow path 32 is connected to conduit 33. A relatively high impedance discharge flow path 34 is connected to annular chamber 30, preferably at its lowest point 31. High impedance discharge flow path 34 may be connected to low impedance flow path 32 or to conduit 33.

Valve seat 26 preferably is formed as an annular ridge surrounding exhaust passage 24 and it preferably has smooth convex surface 38 on the side toward diaphragm 20.

Diaphragm 20 preferably has a ridge 44 for sealing in a circumferential groove 45 formed in housing 12. Preferably, it is clamped between first housing portion 14 and second housing portion 16. It is desirable for second housing portion 16 to be removable from first housing portion 14 so that valve 10 may be serviced. It should be noted that a seal (not shown) should also be provided around high impedance flowpath 34 at the interface between first housing portion 14 and second housing portion 16 to prevent leakage between these portions It is preferred that high impedance discharge flow path 34 have a higher impedance to fluid flow than exhaust passage 24.

FIG. 1 shows the configuration of valve 10 when fluid conduit 33 is unpressurized. In this case, valve 10 is open so that contaminant liquids may drain from conduit 33 through high impedance discharge flow path 34 to annular chamber 30 and thence be purged through exhaust passage 24.

Figure 2:
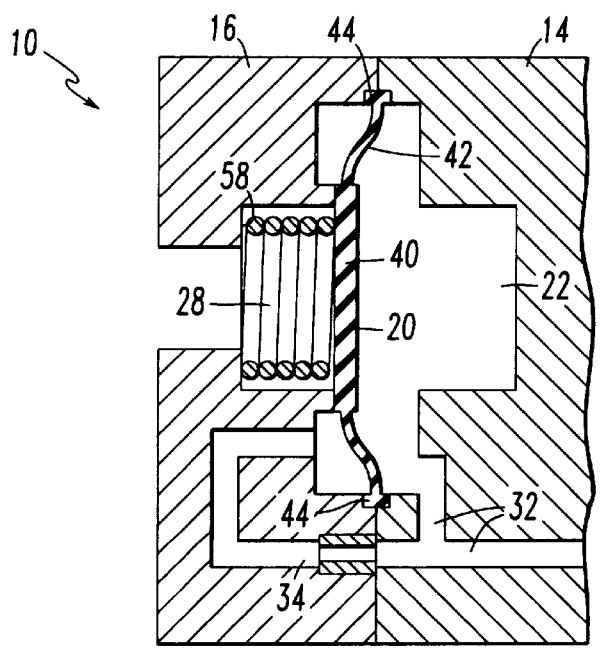
FIG. 2 is a median section of the valve illustrated in FIG. 1 in a closed position.

FIG. 2 shows the configuration of valve 10 when fluid conduit 33 is pressurized. In this case, pressure in control chamber 22 presses diaphragm 20 against valve seat 26 so that valve 10 is closed. Upon onset of pressurization, there is a brief time before diaphragm 20 seats against valve seat 26 during which the liquid contaminant is forcibly expelled through valve 10. After diaphragm 20 is seated against valve seat 26, as long as pressure in conduit 33 remains above a minimum value established by the strength of spring 28, valve 10 remains closed. When the pressure in conduit 33 drops below that minimum value, valve 10 opens to the configuration shown in FIG. 1 so that liquid may drain from it.

Figure 3:
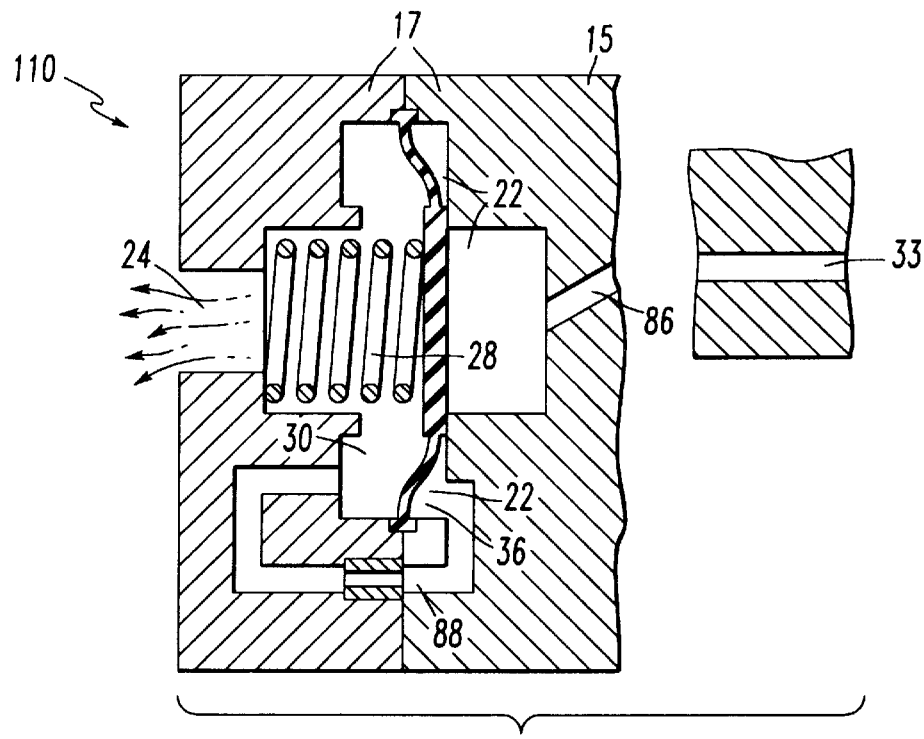
FIG. 3 is a section of an alternate embodiment of the valve in which the high impedance discharge flowpath is connected to a low point on the control chamber of the valve and the control chamber of the valve is connected to the conduit being purged.

FIG. 3 shows another embodiment of the invention, in which valve 110 has an alternative housing 17, which has an alternate first housing portion 15. In this case, low impedance flow path 86 connects control chamber 22 to conduit 33.

When conduit 33 is unpressurized, valve 110 is open so that liquid may drain through low impedance flowpath 86 to control chamber 22 and thence through high impedance flowpath 88 to annular chamber 30 and out through exhaust passage 24.

When the pressure in conduit 33 rises sufficiently to compress spring 28, the valve closes. During the interim, before valve 110 closes, liquid is forcefully expelled from the valve 110 by the rising pressure in conduit 33.

Figure 4:
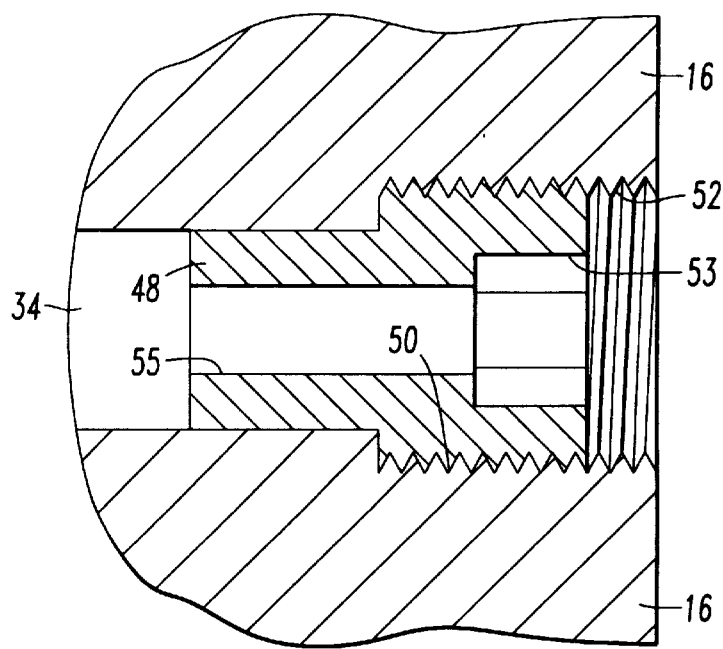
FIG. 4 shows a removable constriction of the high impedance flowpath.

FIG. 4 shows a removable flow restriction 48 which preferably is inserted in high impedance discharge flowpath 34. Flow restriction 48 preferably has an externally threaded portion 50 for engagement with internally threaded portion 52 of discharge flow path 34. Preferably, it also have a socket 53, for example a hexagonal socket, to receive a wrench having a hexagonal exterior. Flow restriction 48 has choke portion 55. Preferably, it also has a filter (not shown) to prevent debris from blocking choke portion 55.

Figure 5:
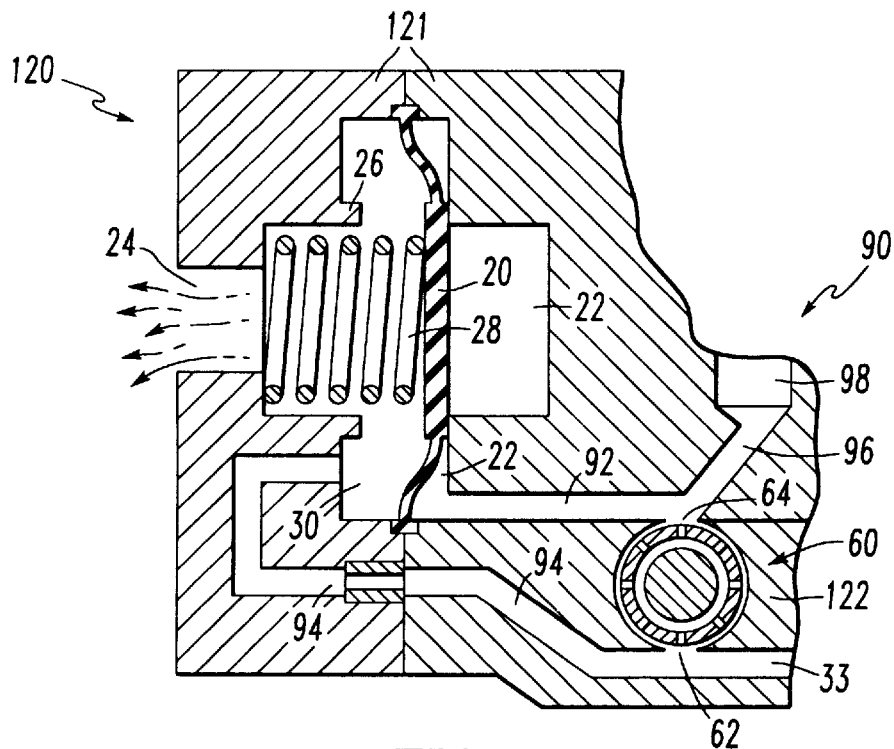
FIG. 5 is a section of another alternative arrangement in which the high impedance flowpath is connected to the wet point on a liquid separator and the control chamber is connected by a relatively low impedance path to a relatively dry point on the liquid separator.

FIG. 5 shows another embodiment of the invention, which is a valve arrangement, generally designated 90 for expelling a liquid contaminant from a fluid conduit 33 which is normally unpressurized but is at times pressurized with a gas which contains the liquid contaminant. Valve arrangement 90 includes a liquid separator, generally designated 60, having a wet connection point 62 and a relatively dry connection point 64. Relatively wet connection point 62 is joined to conduit 33. Valve arrangement 90 has a valve portion, generally designated 120, which has a housing 121 and a diaphragm 20 mounted within housing 121. Valve portion 120 has a control chamber 22 on a first side of diaphragm 20 and an exhaust passage 24 on the second side of diaphragm 20. It has valve seat 26 mounted on the second side of diaphragm 20, positioned so that diaphragm 20 may seal against valve seat 26. It also has a spring 28 located on the second side of diaphragm 20 to press it away from valve seat 26. Valve portion 120 also has annular chamber 30 on the second side of diaphragm 20. Annular chamber 30 surrounds exhaust passage 24 and annular chamber 30 is open to exhaust passage 24 when diaphragm 20 is not sealed against valve seat 26. Purge valve arrangement 90 also has a relatively low impedance flow path 92 between control chamber 22 and relatively dry connection point 64 of liquid separator 60. It also has a relatively high impedance discharge flow path between annular chamber 30 and relatively wet connection point 62. It is preferred that relatively dry connection point 64 be at a greater elevation than relatively wet connection point 62.

Low impedance flowpath 92 joins dry connection point 64 of liquid separator 60 to control chamber 22. A transducer attachment point 98 is connected to dry connection point 64 by transducer passage 96. One feature of this arrangement is that a transducer (not shown) connected at attachment point 98 is generally protected from liquid. Specifically, if the liquid is water, this prevents the transducer from freezing.

Whenever conduit 33 is unpressurized, valve portion 120 is open and liquid contaminants in conduit 33 drain from conduit 33 through high impedance discharge flow path 94 to annular chamber 30 and are purged from valve portion 120 through exhaust passage 24.

When conduit 33 is pressurized, for a brief time before the force exerted by spring 28 is overcome by pressure in control chamber 22, valve portion 120 remains open so that the liquid contaminant is forcefully expelled through valve 120. After that brief time, pressure in control chamber 22 overcomes the force of spring 28 so diaphragm 20 is pressed against valve seat 26 and valve portion 120 is closed.

Figure 6:
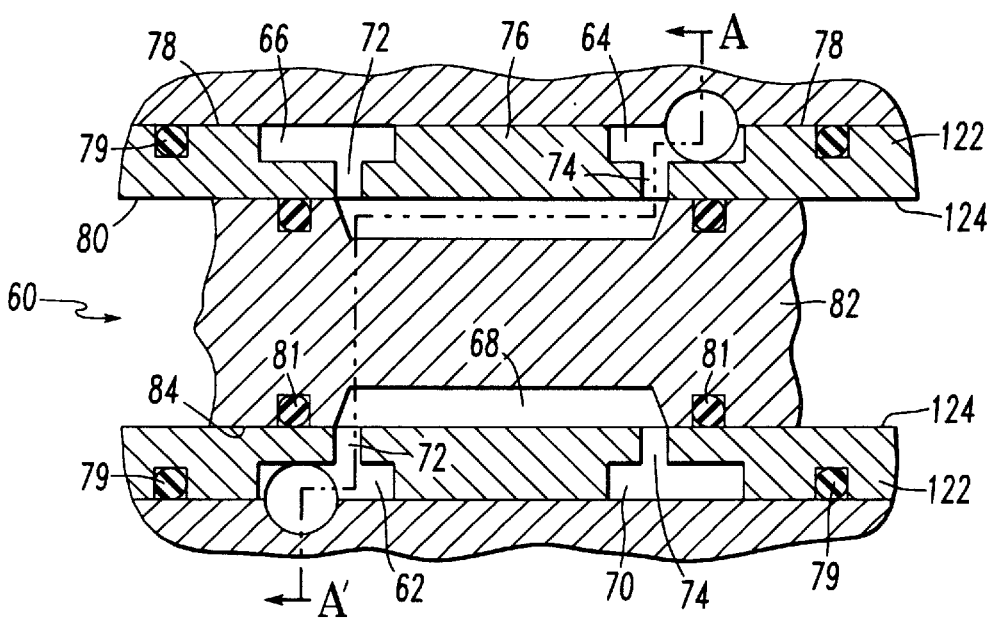
FIG. 6 is a median section of the liquid separator illustrated in FIG. 5.

Details of liquid separator 60 are provided in FIG. 6. The section shown in FIG. 5 is made on a cut defined by A-A' in FIG. 6. The liquid separator 60 is disposed within bore 124 in housing portion 122. Liquid separator 60 includes a bushing 76 which has an exterior surface 78 and an interior surface 80. Liquid separator 60 has three annular separation chambers 66, 68 and 70, each of which is oriented approximately in a vertical plane. First annular separation chamber 66 and third annular separation chamber 70 are cut into exterior surface 78 of bushing 76. O-rings 79 are provided to seal between bore 124 and bushing exterior surface 78.

Core 82 is disposed within interior surface 80 of bushing 76. Second- annular separation chamber 68 is cut into exterior surface 84 of core 82. O-rings 81 act as circumferential seals between core 82 and bushing 76. Wet connection point 62 is formed at the lowest point on first annular separation chamber 66 and relatively dry connection point 64 is formed at the highest point on third annular separation chamber 70.

A first plurality of relatively small passages 72 connect first annular separation chamber 66 to second annular separation chamber 68. These, preferably, are formed by drilling radially inward.

A second plurality of relatively small passages 74 connect third annular separation chamber 70 to second annular separation chamber 68. These, preferably, are formed by drilling radially inward through bushing 76.

Each of the annular separation chambers 66, 68 and 70 provides two paths, on opposite sides of the annular separation chamber, by which liquid may drain downward. The relatively small passages 72 and 74 provide for flow of gas between annular separation chamber 66, which is connected to wet connection point 62 and annular separation chamber 70, which is connected to relatively dry connection point 64, while preventing large masses of liquid from being propelled by pressure of the gas from wet connection point 62 to dry connection point 64. It is preferred that the second annular separation chamber have a diameter smaller than either that of the first annular separation chamber or the third annular separation chamber, so that the relatively small passages 72 and 74 can be drilled radially in bushing 76.

A person skilled in the art will be aware that many other types of liquid separator may be used in place of the device shown.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A purge valve for expelling a liquid contaminant from a fluid conduit which is normally unpressurized but is at times pressurized with a gas which contains such liquid contaminant, said valve comprising:
    (a) a housing;
    (b) a diaphragm mounted within said housing;
    (c) a control chamber on a first side of said diaphragm;
    (d) an exhaust passage on a second side of said diaphragm;
    (e) a valve seat surrounding an upstream end of said exhaust passage, said valve seat positioned so that said diaphragm may seal against said valve seat;
    (f) a spring disposed at least partially within said exhaust passage on said second side of said diaphragm to provide a spring force on said diaphragm to press it away from said valve seat;
    (g) an annular chamber on said second side of said diaphragm, said annular chamber surrounding said exhaust passage, said annular chamber open to said exhaust passage when said diaphragm is unseated from said valve seat;
    (h) a relatively low impedance flow path connected to said control chamber, said relatively low impedance flow path connectable to such fluid conduit;
    (i) a relatively high impedance discharge flow path connected to said annular chamber, said relatively high impedance discharge flow path at least one of connected to said control chamber, connected to said low impedance flow path and connectable to such fluid conduit;
    so that when said valve is connected to such fluid conduit and whenever such fluid conduit is unpressurized said valve is open due to said spring force so that such liquid contaminant may drain from such fluid conduit through said high impedance discharge flow path to said annular chamber and thence be purged from said valve through said exhaust passage; and
    so that when such fluid conduit is pressurized for a brief time before said spring force is overcome by pressure in said control chamber, said valve remains open so that such liquid contaminant is forcefully expelled through said valve and after said brief time, when said pressure in said control chamber overcomes said spring force, said diaphragm is pressed against said valve seat so that said valve is closed.

2. A purge valve according to claim 1 wherein said high impedance discharge flow path is connected to said control chamber.

3. A purge valve according to claim 2 wherein said high impedance discharge flow path is connected to said control chamber at substantially a lowest portion thereof.

4. A purge valve according to claim 1 wherein said high impedance discharge flow path is connected to said low impedance flow path.

5. A purge valve according to claim 4 wherein said high impedance flow path is connected to said low impedance flow path at an elevation lower than a connection point of said control chamber and said low impedance flow path.

6. A purge valve according to claim 1 wherein said valve seat is formed as an annular ridge surrounding said upstream end of said exhaust passage.

7. A purge valve according to claim 6 wherein said annular ridge has a smooth convex surface on a side toward said diaphragm.

8. A purge valve according to claim 1 wherein said diaphragm has a relatively stiff central portion and a relatively flexible annular outer portion.

9. A purge valve according to claim 1 wherein said diaphragm has a circumferential ridge for sealing inside a circumferential groove formed in said housing.

10. A purge valve according to claim 9 wherein said diaphragm is clamped between a first portion of said housing and a second portion of said housing.

11. A purge valve according to claim 10 wherein said second portion of said housing can be removed from said first portion of said housing so that said valve can be serviced.

12. A purge valve according to claim 1 wherein said relatively high impedance discharge flow path includes a removable flow restriction.

13. A purge valve according to claim 12 wherein said removable flow restriction has a threaded exterior portion for engagement with an internally threaded portion of said high impedance discharge flow path.

14. A purge valve according to claim 1 wherein said high impedance discharge flow path has a higher impedance than said exhaust passage.

15. A purge valve according to claim 1 wherein said exhaust passage has a relatively large diameter inner portion to enclose at least a portion of said spring and a relatively small diameter outer portion to provide an internal shoulder to support said spring.

16. A purge valve arrangement for expelling a liquid contaminant from a fluid conduit which is normally unpressurized but is at times pressurized with a gas which contains such liquid contaminant, said arrangement comprising:
    (a) a liquid separator having a wet connection point and a relatively dry connection point, said wet connection point joined to such fluid conduit;
    (b) a purge valve having:
        (i) a housing;
        (ii) a diaphragm mounted within said housing;
        (iii) a control chamber on a first side of said diaphragm;
        (iv) an exhaust passage on a second side of said diaphragm;
        (v) a valve seat surrounding an upstream end of said exhaust passage, said valve seat positioned so that said diaphragm can seal against said valve seat;
        (vi) a spring disposed on said second side of said diaphragm to provide a spring force on said diaphragm to press it away from said valve seat;
        (vii) an annular chamber on said second side of said diaphragm, said annular chamber surrounding said exhaust passage, said annular chamber open to said exhaust passage when said diaphragm is unseated from said valve seat;
        (viii) a relatively low impedance flow path between said control chamber and said relatively dry connection point on said liquid separator;
        (ix) a relatively high impedance discharge flow path between said annular chamber and said wet connection point on said liquid separator;
    so that whenever such fluid conduit is unpressurized, such liquid contaminant may drain from such fluid conduit through said high impedance discharge flow path to said annular chamber and thence be purged from said valve through said exhaust passage; and so that when such fluid conduit is pressurized for a brief time before said spring force is overcome by pressure in said control chamber, said valve remains open so that such liquid contaminant is forcefully expelled through said valve and after said brief time, when said pressure in said control chamber overcomes said spring force, said diaphragm is pressed against said valve seat so that said valve is closed.

17. A purge valve arrangement according to claim 16 wherein said relatively dry connection point on said liquid separator is at a greater elevation than said wet connection point on said liquid separator.

18. A purge valve arrangement according to claim 17 wherein said liquid separator includes three annular separation chambers defined within said housing, each one of said three annular separation chambers oriented in a substantially vertical plane, said wet connection point being at a low point on a first one of said three annular separation chambers, said relatively dry connection point being at a high point on a third one of said three annular separation chambers, said first one of said three annular separation chambers being connected to a second one of said three annular separation chambers through a first plurality of relatively small passages, said second one of said three annular separation chambers being connected to said third one of said three annular separation chambers through a second plurality of relatively small passages.

19. A purge valve arrangement according to claim 18 wherein said second one of said three annular separation chambers has a lesser diameter than said first one of said three annular separation chambers and a lesser diameter than said third one of said three annular separation chambers and wherein each of said first plurality of relatively small passages is oriented substantially radially and wherein each of said second plurality of relatively small passages is oriented substantially radially.

20. A purge valve arrangement according to claim 19 wherein said first one of said three annular separation chambers and said third one of said three annular separation chambers is formed in an exterior surface of a bushing which is disposed within a substantially horizontal bore disposed in said housing, said second one of said three annular separation chambers being formed in an exterior surface of a core disposed within an inner surface of said bushing and each of said first plurality of relatively small passages is formed through said bushing from said first one of said three annular separation chambers to said inner surface of said bushing to connect to said second one of said three annular separation chambers and wherein each of said second plurality of relatively small passages is formed through said bushing from said third one of said three annular separation chambers to said inner surface of said bushing to connect to said second one of said three annular separation chambers.

21. A purge valve arrangement, according to claim 16, further including a transducer attachment point attached to said dry connection point of said liquid separator.

\* \* \* \* \*